Jan. 14, 1941.   J. H. BLANKENBUEHLER   2,228,436
POWER DISTRIBUTION SYSTEM
Filed Sept. 23, 1937   2 Sheets-Sheet 1
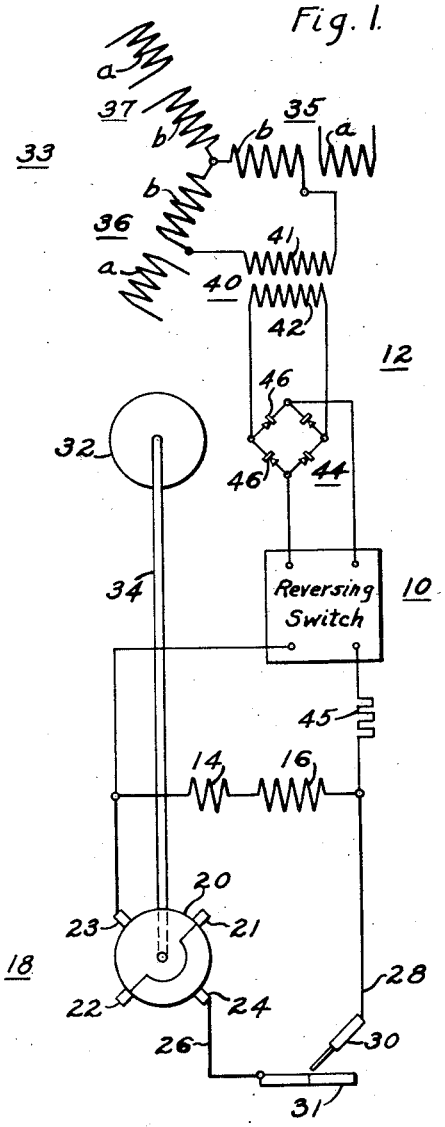
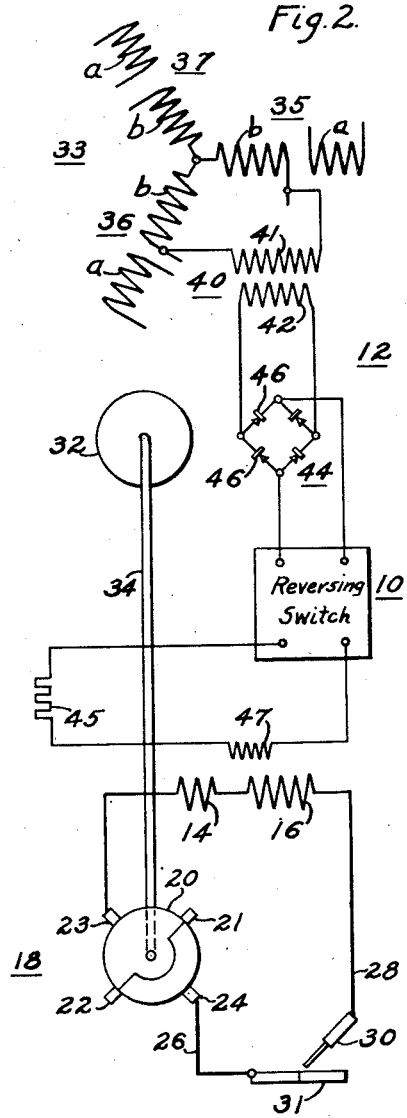
WITNESSES:
James F. Young
INVENTOR
John H. Blankenbuehler.
BY
G. M. Crawford
ATTORNEY Jan. 14, 1941.　　J. H. BLANKENBUEHLER　　2,228,436
POWER DISTRIBUTION SYSTEM
Filed Sept. 23, 1937　　2 Sheets-Sheet 2
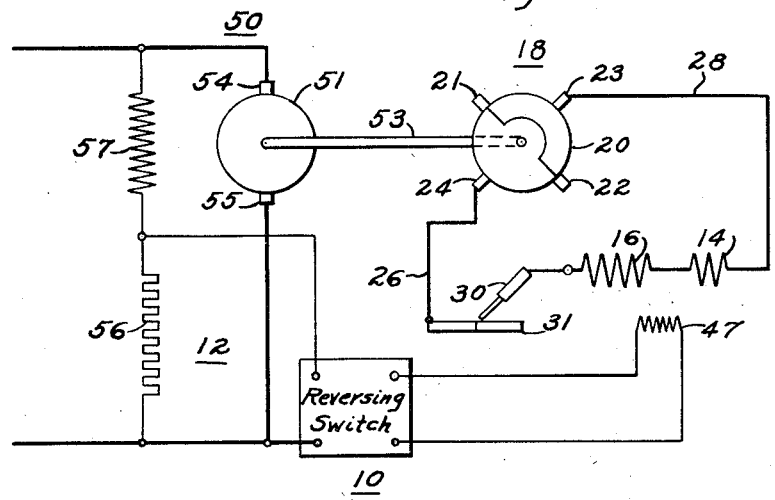
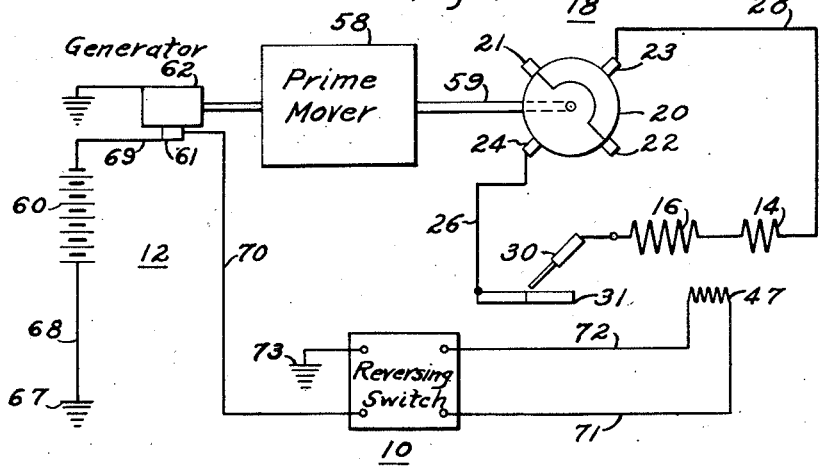
WITNESSES:
INVENTOR
John H. Blankenbuehler.
BY
ATTORNEY Patented Jan. 14, 1941

2,228,436

UNITED STATES PATENT OFFICE 2,228,436

POWER DISTRIBUTION SYSTEM

John H. Blankenbuehler, Edgewood, Pa., assignor to Westinghouse Electric & Manufacturing Company, East Pittsburgh, Pa., a corporation of Pennsylvania Application September 23, 1937, Serial No. 165,286

11 Claims. (Cl. 171—312)

My invention relates, generally, to power distribution systems, and it has particular reference to means for controlling the polarity of the output terminals of a dynamo-electric machine used in such systems.

In power distribution systems, it is particularly desirable that the terminal polarity of dynamo-electric machines of certain types used therein should be prevented from accidental reversal, and it is further desirable in some instances to provide for reversing the terminal polarity of such dynamo-electric machines at will. The maintaining of a desired terminal polarity is particularly desirable in connection with generators that are used in arc-welding systems, since reversal of the terminal polarity of an arc welding generator will, in many instances, result in extremely unsatisfactory welds, owing to the change in direction of the magnetic field surrounding the arc causing a "blowing" of the arc, with its resultant splattering of molten weld metal. Under other conditions, however, it is also often desirable to positively reverse the terminal polarity of an arc-welding generator from the conventional negative electrode polarity, as for instance, when welding thin materials or aluminum, and in using certain alloy and non-ferrous weldrods.

Provisions for reversing the terminal polarity of dynamo electric machines used in arc-welding systems have heretofore generally comprised multi-pole line switches which change the internal connections of the load circuit of the machine. These provisions have not, however, proved altogether satisfactory, since the switch must carry the full load current and must, therefore, be of relatively heavy construction and have a high contact pressure. Such a construction requires a relatively great force to operate the switch, so that the switch must be particularly rigidly mounted, thereby further increasing its manufacturing cost.

It has also been found that dynamo-electric machines which have no shunt field winding to aid in building up and maintaining the main magnetic flux of the machine are particularly susceptible to reversal of the polarity of the residual magnetism, and may, therefore, often build up with a terminal polarity opposite to that indicated by the position of the polarity reversing line switch. This is particularly true of generators of the cross-field type, which normally have a lower open circuit terminal voltage than welding generators of other types, so that accidental contact of the electrode of a welding generator of the cross-field type with the electrode of a welding machine of a type having a higher open circuit voltage will cause a reverse current to flow in the load circuit of the cross-field generator, thereby reversing its residual polarity.

Therefore, the object of my invention generally stated is to provide for readily controlling the polarity of a dynamo-electric machine of the cross-field type by the use of auxiliary control means.

More particularly, it is an object of my invention to provide for reversing the polarity of the terminal connections of a dynamo-electric machine by the use of auxiliary polarity control means.

Another object of my invention is to provide an auxiliary polarity control circuit in connection with a field winding of a dynamo-electric machine of the cross-field type, to provide for control of the terminal polarity thereof.

Still another object of my invention is to provide switch means in connection with an auxiliary control circuit for a dynamo-electric machine of the cross-field type for reversing the polarity thereof without interrupting the load circuit.

Other objects of my invention will, in part, be obvious and, in part, appear hereinafter.

My invention, accordingly, is disclosed in the embodiments thereof shown in the accompanying drawings, and comprises the features of construction, combination of elements, and arrangement of parts which will be exemplified in the construction hereinafter set forth, and the scope of the application of which will be indicated in the appended claims.

For a complete understanding of the nature and scope of my invention, reference may be had to the following detailed description, taken in connection with the accompanying drawings, in which Figure 1 is a diagrammatic view of an arc-welding system employing a preferred form of my invention in connection with a dynamo-electric machine of the cross-field type;

Fig. 2 is a diagrammatic view of a welding system embodying an alternative form of my invention;

Fig. 3 is a diagrammatic view of a welding system illustrating an embodiment of another form of my invention; and Fig. 4 is a diagrammatic view of a welding system illustrating a further variation of my invention.

Referring particularly to Figure 1, it may be seen that in practicing a preferred form of my invention, I prefer to provide a reversing switch 10, of any conventional form, for associating a source of auxiliary control potential 12 with the field pole windings of a dynamo-electric machine, as for instance, with the commutating field winding 14 and series field winding 16 of the dynamo-electric machine 18, in order to selectively apply an auxiliary polarity control potential to these field windings, under all conditions, whereby the residual polarity of the pole members with which these windings are associated may readily be controlled, and the terminal polarity of the dynamo-electric machine therefore readily determined.

Referring more particularly to Fig. 1, it may be seen that the dynamo-electric machine 18 may, as therein illustrated, comprise a self-excited direct-current generator of the cross-field type having an armature 20 with which are associated short circuited auxiliary excitation brushes 21 and 22, and main load circuit brushes 23 and 24. The main load circuit brushes 23 and 24 may be connected in series circuit relation with the commutating field winding 14, the series field winding 16 and the dynamo-electric machine terminal connections 26 and 28, for connection to a load comprising, for example, an electrode 30 and work 31 upon which a welding operation is to be performed.

To provide for rotation of the armature 20 of the generator 18, the rotor 32 of a motor 33 may be connected to the armature 20 by means of a shaft 34. The primary windings 35, 36 and 37 of the motor 33, which is herein shown as a polyphase alternating current motor, may each comprise separate sections 35a and 35b to facilitate connection to sources of different voltage.

The source of auxiliary polarity control potential 12 may, as in this instance, comprise a control transformer 40, having a primary winding 41 connected with sections 35b and 36b of the sectionalized primary windings of the motor 33 so that reconnection of the motor windings for connection to a source of different potential does not affect the transformer primary winding 41. A secondary winding 42 may be connected with rectifying means 44 to provide a source of unidirectional polarity control potential for connection to the self-excited commutating winding 14 and series winding 16 of the dynamo-electric machine 18, through the reversing switch 10 and current limiting resistance 45. The rectifying means 44 may be of any desired type, comprising, for example, a plurality of unidirectional current devices 46, arranged in a conventional bridge connection, as shown.

By thus connecting such a source of auxiliary polarity control potential to the self-excited windings 14 and 16 of the generator 18, it may readily be seen that the polarity of the residual magnetism of the field pole members with which the windings 14 and 16 are associated may readily be maintained as indicated by the switch position, even though it is temporarily reversed by contact of the electrode 30 with the electrode of a dynamo-electric machine having a higher open circuit voltage. Furthermore, by providing a reversing switch 10 of any conventional type in connection with the source of auxiliary polarity control potential 12, it may be seen that in order to reverse the terminal polarity of the dynamo-electric machine 18, intentionally, it is merely necessary to operate switch 10 and reverse the direction of the auxiliary polarity control potential applied to the self-excited commutating winding 14 and series winding 16, therefore entirely doing away with the necessity for the heavy duty reversing switch heretofore necessary in the load circuit of dynamo-electric machines of this type.

Referring to Fig. 2, it may be seen that in an alternative form of my invention, I prefer to provide a separate auxiliary polarity control field winding 47 in association with the commutating winding 14 and series field winding 16 of the dynamo-electric machine 18, and apply the polarity control potential from the auxiliary source 12 through the reversing switch 10 and current limiting resistance 45 to this winding, instead of to the main field windings 14 and 16 as in Fig. 1, still utilizing the switch 10 for reversing the residual polarity as before.

In the form of my invention illustrated in Fig. 3, I have disclosed means for controlling the residual polarity of a dynamo-electric machine 18, which is disposed to be driven by means of a direct current motor 50, the armature 51 of which is connected in driving relation to the armature 20 of the dynamo-electric machine by means of a shaft 53. Brushes 54 and 55 of the motor 50 may be connected to a suitable direct current power source as shown.

In order to provide a control potential for the auxiliary polarity control winding 47, which is associated with the series field winding 16 and commutating field winding 14 of the dynamo-electric machine 18, I prefer to utilize a control resistor 56, connected in series circuit relation with the shunt field winding 57 of the driving motor 50 to the direct current source of power. The auxiliary polarity control winding 47 may be connected across the control resistance 56 through a reversing switch 10, whereby a substantially constant control potential may be applied to the auxiliary polarity control winding 47 for controlling the residual polarity of the field pole members of the dynamo-electric machine 18. By operation of the reversing switch 10 it may be seen that the residual polarity, and hence terminal polarity of the machine, may readily be reversed at will.

In a further embodiment of my invention, as illustrated in Fig. 4, it may be seen that I disclose connections for the application of a control potential to the auxiliary polarity control winding 47 of a dynamo-electric machine 18, the armature 20 of which is adapted to be driven by a gas engine 58 by means of a shaft 59. Connections may be provided between the winding 47 and the battery 60 of the gas engine 58, on the charging side of an electrical cut-out 61, which is conventionally connected with the generator 62 of the gas-engine 58. In this instance the excitation circuit extends from ground 67, through conductor 68, battery 60, conductor 69, cut-out 61, conductor 70, reversing switch 10, conductor 71, auxiliary polarity control field winding 47, conductor 72, reversing switch 10 to ground 73 for constantly energizing the winding 47 and therefore determining the polarity of the residual magnetism of the dynamo-electric machine.

With respect to the embodiments of the invention shown in Figs. 3 and 4, it is to be understood that instead of using an auxiliary polarity control field winding 47 for determining and controlling the polarity of the machine, the auxiliary polarity control potential source 12 may be connected directly to the field windings 14 and 16 of the machine as in Fig. 1.

It will now be apparent that I have provided means whereby the polarity of the terminal connections of a dynamo-electric machine, particularly of the cross field type, may not only be positively determined, but may be also readily reversed at will. Since my invention requires no interruption of the load circuit in securing the reversal of the polarity of the terminal connections of the dynamo-electric machine, it may be seen that reversing switches of the heavy construction as heretofore found necessary in load circuit connections may be dispensed with, and simple snap switches of small capacity and light construction used, thus affording a substantial reduction in the manufacturing costs and convenience in operating the dynamo-electric machine.

It is to be understood that in providing auxiliary polarity control of a field winding of a dynamo-electric machine, and particularly in connection with dynamo-electric machines of the cross-field type, as herein set forth, I do not in any sense propose thereby to effect any regulation of the output characteristics thereof. The purpose of my invention is to provide for reversing or maintaining the residual polarity of the dynamo-electric machine, the main field windings of which are the governing factor in determining the output characteristics of the machine when supplying power to the load.

Since certain changes may be made in the above construction, and different embodiments of the invention may be made without departing from the spirit thereof, it is intended that all the matter contained in the above description or shown in the accompanying drawings shall be considered as illustrative, and not in a limiting sense.

I claim as my invention:

1. The combination in a welding system of, a dynamo-electric machine of the cross-field type provided with a plurality of main field windings, an armature rotatably associated in relation to said windings, terminal connections adapted for connection to a welding circuit, a plurality of brushes associated with the armature including auxiliary short-circuited brushes disposed to provide a path for a cross-magnetizing armature current, a pair of main brushes disposed in quadrature with said auxiliary brushes and connected in series circuit relation with the main field windings and terminal connections, a separate source of control potential, and means including a reversing switch for connecting the main field windings to said separate source of control potential to predetermine the polarity of the terminal connections.

2. In combination in an arc welding system, a welding generator of the cross-field type having a plurality of series field windings, an armature rotatably associated with said windings, a plurality of brushes associated with the armature including short-circuited auxiliary brushes and main load brushes disposed in quadrature thereto, terminal connections adapted for connection to a welding circuit, said terminal connections being disposed in series circuit relation with said main brushes and series field windings, an auxiliary polarity control winding associated with said series field windings, a separate source of constant potential, and means including a reversing switch for connecting the auxiliary winding to the constant potential source to control the polarity of the generator terminal connections.

3. The combination in a power system including, an alternating current motor having a primary winding, a generator of the cross-field type having an armature connected with the rotor of said motor, a plurality of main field pole windings on the generator, a plurality of brushes associated with the armature including auxiliary short-circuited brushes disposed to provide a path for an armature cross-field magnetizing current and main brushes connected in series circuit relation with the main field windings, terminal connections for connection to a load circuit disposed in series circuit relation with the armature, main brushes and main field windings, an auxiliary source of potential including a unidirectional current device disposed in connection with the motor primary winding, and means for reversibly connecting said auxiliary source with one of the main field pole windings of the generator for predetermining the polarity of the terminal connections.

4. The combination in a power system, of a dynamo-electric machine of the cross-field type having a plurality of main field windings, an armature rotatably disposed in relation to said windings, a plurality of brushes associated with the armature including a pair of main brushes connected in series circuit relation with the main field windings, terminal connections associated with the armature and main field windings for connection with a load circuit, means including a driving motor having a primary winding adapted to provide rotation of the said armature, and circuit means including a rectifier device disposed in connection with said motor primary winding connected with said main field windings for selectively applying a substantially constant control potential thereto for determining the polarity of said terminal connections.

5. A power system including, a dynamo-electric machine having a rotatably mounted armature, main field excitation windings connected in series circuit relation with said armature, terminal connections associated with the main field windings and armature for connection to a load circuit, an auxiliary polarity control field winding, a driving motor connected to drive the said armature, a shunt field winding on the driving motor, a control resistance connected in series circuit relation with said shunt field winding, and means for reversibly connecting the auxiliary polarity control field winding and the control resistance in shunt circuit relation with the control resistance to apply a control potential to the polarity control winding for determining the polarity of the terminal connections.

6. The combination in a welding system of, a welding generator of the cross-field type having a plurality of main field excitation windings, terminal connections related in series circuit relation therewith, an external source of substantially constant potential, an auxiliary polarity control winding associated with the main field windings, and means for reversibly connecting the auxiliary winding to the external source to provide an independent means for selectively determining the polarity of the terminal connections.

7. In combination, a self-excited direct-current generator of the cross-field type provided with series field windings, an engine for driving the generator, an ignition circuit including a battery for the engine, an auxiliary polarity control field winding on the generator and a reversing switch connecting the auxiliary polarity control field winding to the battery thereby to provide for selectively determining the polarity of the generator.

8. The combination in a generator of the cross-field type, of an armature having main and auxiliary brush circuits, a plurality of field excitation windings, a separate source of control potential, and means for selectively connecting one of the said field excitation windings to the source of control potential to control the no-load terminal polarity of the main brush circuit.

9. In a generator of the cross-field type, the combination of an armature having main and auxiliary brushes, means connecting the auxiliary brushes to provide an armature path for a cross-magnetizing excitation current, a plurality of field excitation windings, a source of control potential, and means for selectively connecting one of the field excitation windings to the source of control potential to control the direction of flow of the no-load cross-magnetizing excitation current in the auxiliary brush circuit.

10. A self-excited generator of the cross-field type comprising, an armature having main and auxiliary brush circuits, a plurality of field excitation windings including main series field windings connected with the main brush circuit, a separate source of potential, and switch means for selectively connecting one of the field excitation windings to the separate source of potential so as to control the no-load terminal polarity of the main brush circuit of the generator.

11. The combination with a generator comprising a plurality of terminals, a plurality of field members and an armature having a plurality of excitation windings associated therewith for producing a plurality of dependent cross-acting magnetic fluxes effective along axes substantially at right angles to each other to produce a voltage between the terminals, of a separate source of substantially constant control voltage, and means including a reversing switch connected between the source of control voltage and one of the field excitation windings for controlling the direction of at least the cross-acting magnetic flux having its axis substantially at right angles to the axis of the said winding to thereby control the polarity of the generator terminals.

JOHN H. BLANKENBUEHLER.